July 8, 1924.
P. MUELLER
1,500,417
FLOAT VALVE OPERATING MECHANISM
Original Filed Oct. 29, 1919    2 Sheets—Sheet 1
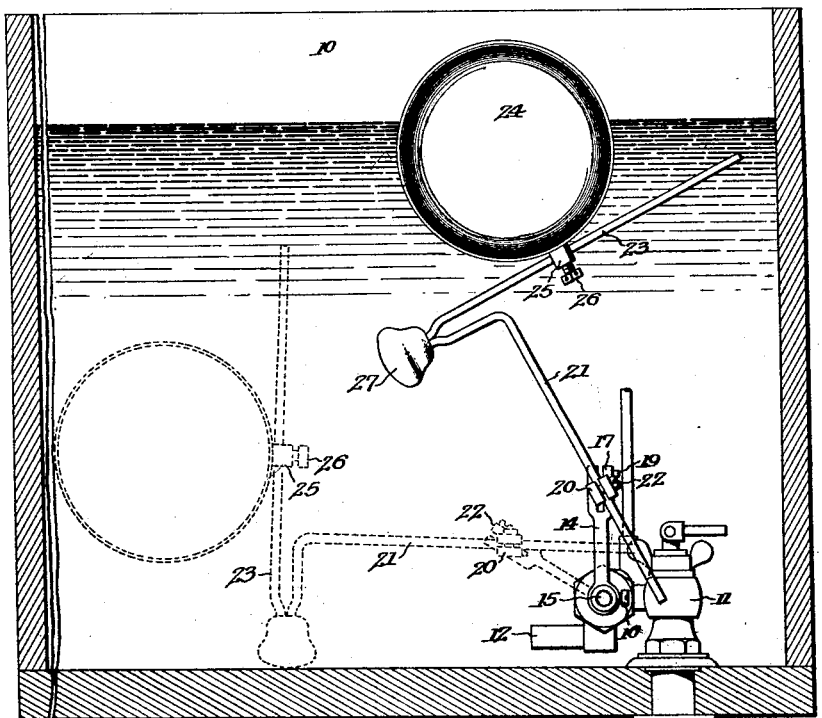
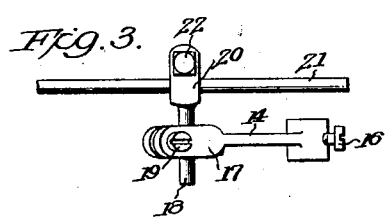
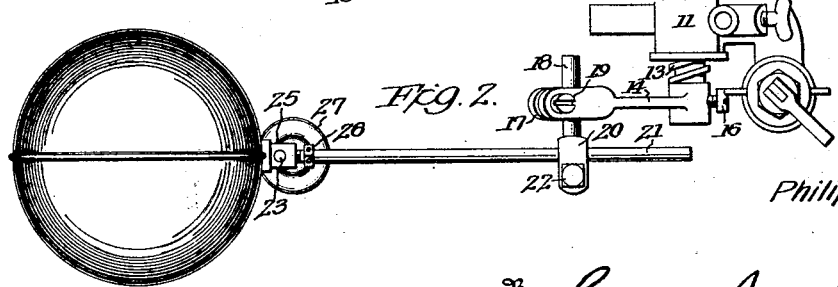
Inventor
Philip Mueller
By Cushman, Bryant & Darby
Attorneys July 8, 1924.

P. MUELLER

FLOAT VALVE OPERATING MECHANISM

Original Filed Oct. 29, 1919   2 Sheets-Sheet 2

1,500,417

Inventor
Philip Mueller

By Cushman, Bryant & Darby
Attorneys

Patented July 8, 1924.

1,500,417

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FLOAT-VALVE-OPERATING MECHANISM.

Original application filed October 29, 1919, Serial No. 334,122. Divided and this application filed April 30, 1923. Serial No. 635,599.

*To all whom it may concern:*

Be it known that PHILIP MUELLER, a citizen of the United States, residing at Decatur, in the county of Macon and State of Illinois, have invented new and useful Improvements in Float-Valve-Operating Mechanism, of which the following is a specification.

The present invention, which is a division of applicant's co-pending application, Serial No. 334,122, filed October 29th, 1919, Patent No. 1,457,314, June 5, 1923, has been made the subject of a separate application under official requirement, and relates to float valve operating mechanism, more particularly designed for closet tanks, but capable of other adaptation.

It has for its objects to provide a connection between the inlet valve and the float, which may be conveniently and readily adjusted to accommodate tanks of different dimensions, both as to length, width, and depth, and which may be adjusted to give varying depths of fill so that a practically universal adjustment of the ball relative to the tank and the valve may be secured. Furthermore, provision is made whereby the operating parts, particularly the float, are protected from shock when the tank empties and the float, with its connecting rod, falls.

A further object of the present development is to provide a float supporting rod of such shape, preferably of substantially a T-shape so that a flexible bumper may be secured thereto.

In the drawings herewith:

Figure 1 is a longitudinal sectional view of so much of a tank as is necessary to illustrate my invention, showing an inlet valve and my improved float connection, the float being shown in its two positions in full and dotted lines.

Figure 2 is a plan view of the float and its connections, so much of the valve mechanism being shown as is necessary to illustrate the connection of the float thereto.

Figure 3 is a detail view to show the reversibility of the parts.

Figure 4:
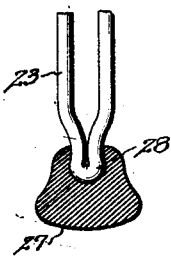
Figure 4 is a detail view of one type of bumper for the float rod and its connection to said rod.

Referring to the drawings by numbers, like numbers indicating like parts in the several views, 10 designates a tank of any suitable form and dimensions. The tank is provided with an inlet valve 11 connecting with the usual supply pipe, and in the present instance shown as entering at the bottom of the tank, as is customary, although it will be understood that the disposition of the inlet relation to the tank is not material. The said valve 11 is provided with a suitable outlet 12 of any desired form, which is controlled by any suitable valve, which valve in the present instance is of the quick compression type, and is operated by the quick screw 13, (see Fig. 2). Adjustably mounted on the end of this screw is a valve operating arm 14, the said arm being preferably mounted, as shown in Fig. 1, on the corrugated stem 15 of the quick screw 13, the arm 14 being correspondingly corrugated so that a very exact angular adjustment of the arm 14 about the corrugated valve stem 15 can be secured, and the position of the arm 14 varied as the necessities of the case may require, the arm being held from endwise movement by means of a set screw 16. The arm 14 at its outer end is forked, as shown at 17, and provided with a seat to receive an adjustable rod 18, which rod is clamped in the fork 17 by the clamping screw 19, and may be adjusted so as to secure an adjustment of the float widthwise of the tank as shown in the present embodiment, and the said rod 18, while it is shown as a relatively short rod may, of course, be of desired length. Not only is the rod 18 adjustable longitudinally in the fork 17, but it may be adjusted angularly in its seat so as to give any desired inclination to a fork 20 at the end of the rod, which fork 20 is designed to receive the float-carrying rod 21, which is longitudinally and angularly adjustable therein, being clamped in place by the clamping screw 22.

It will be observed that the rod 18 may be mounted in the position shown in Figure 2 so that the float rod 21 will lie on one side of the arm 14, or it may be reversed as shown in Figure 3, where the float rod 21 will lie on the other side of the said arm 14, so that if there is not clearance enough on one side of the arm 14 for the float carried by the rod 21, it can be readily reversed and placed upon the other side.

The rod 21, as shown in Figure 1, is substantially T-shaped, having the limb 23 upon which is adjustably mounted the float 24, the said float having the perforated lug 25 which slides freely on the limb 23, a set screw 26 being provided to clamp the float in any position of adjustment.

With this construction, it will be seen that a universality of adjustment is secured for the float which will accommodate it to a variety of conditions under which it may be necessary to install the valve 11 and its operating parts. The arm 14 is angularly adjustable about the valve stem 15 so that it may be placed in any position necessary to give efficient opening and closing movements to the valve. The rod 18 is adjustable at right angles and angularly with respect to the arm 14, so that the float rod carried by it may be positioned close to or away from the plane of the arm 14, and by reason of the reversibility of the arm, as shown in Figs. 2 and 3, may be placed on either side thereof. The float rod 21 is longitudinally and angularly adjustable in the forks 20 of the rod 18, so that the distance of the float from the valve 11 and its angular position may be varied, and finally the float 24 may be adjusted along the limb 23 to accommodate the needs of the particular installation.

In order that these connections may be relieved so far as possible from shock, and that the float proper may not be injured, I preferably provide the float-carrying rod with a bumper 27, which is conveniently attached, as shown in Figs. 1 and 4, to an outwardly bent and preferably looped section 28 of the rod 21 and the limb 23, the loop thrown outwardly from these rods being pinched or crimped at its lower end so as to form an enlargement over which the bumper 27 of rubber, or other suitable material, may be engaged and interlocked.

With this construction, upon descent of the float, the bumper 27 will strike the bottom of the tank and absorb the shock of the falling parts, so that any danger of loosening the connections heretofore described between the valve and the float is eliminated and the float is protected from injury.

Figure 5:
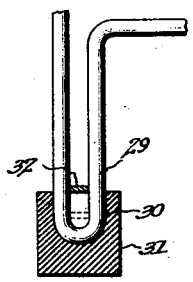
Figures 5, 6 and 7 are detail views of a slightly modified form of bumper and means for connecting the same to the float rod.
Figure 6:
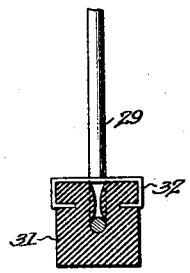
Figure 7:
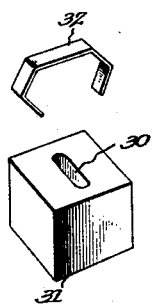

Referring to Figs. 5, 6 and 7, wherein is disclosed a slightly modified form of bumper and a convenient means for securing it to the looped float rod, it will be noted that in this construction the loop 29 of the rod is not crimped at its end, as shown in Figure 4, but is left open, being designed to enter a recess 32 formed in the bumper block 31, and is preferably secured therein by means of the yieldable clip 32, which straddles the block and passes through the loop 29. The ends of the clip 32 are embedded in the sides of the block 31, so as to compress the rubber and maintain the rod firmly in place, as shown in Fig. 6, the clip action bulging the rubber into the loop.

Figure 8:
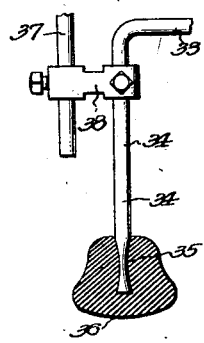
Figure 8 is a detail view of another form of bumper.

Referring to Fig. 8, which discloses another modified form of the invention, it will be observed that the rod 33 is provided with a depending arm 34 having reduced and, as shown, convexed sides 35, which are arranged to fit in a recess in the yieldable bumper 36 and be removably secured thereto, the material of the bumper bulging into the recessed rod. The rod 33, in the form shown in Fig. 8, may be adjustably connected to the float arm 37 by the block 38, as shown.

From the foregoing, it will be seen that I have provided a simple and efficient float connection and bumper, and one which will effectively protect the parts against injury during operation of the valve mechanism.

It will be understood that mechanical alterations may be made in the construction of my invention without departing from the spirit thereof and the scope of the appended claims.

I claim:

1. A valve operating float comprising a rod having an integral upwardly extending arm bent at an angle to the main portion of the rod, a float adjustably connected to said arm, and a bumper secured to said rod between the ends thereof.

2. A valve operating float comprising a rod bent between its ends to form a loop, a bumper secured to said loop, and a float connected to said rod.

3. A valve operating float comprising a rod bent between its ends to form a loop, a bumper, a recess in said bumper adapted to receive said loop, and means to secure said loop in said recess.

4. A valve operating float comprising a rod bent to substantially T-shape with one of the limbs of the T-head in the form of a loop, a bumper secured to said looped limb, and a float adjustably mounted on the other T-head limb.

5. A valve operating float comprising a rod bent to substantially T-shape with one of the limbs of the T-head in the form of a loop, a bumper to receive said limb, and means to secure said loop in said bumper.

6. A valve operating float comprising a rod bent to substantially T-shape with one of the limbs of the T-head in the form of a loop, a bumper recessed to receive said limb, and means for detachably securing said loop in said bumper recess.

7. A valve operating float comprising a rod bent to substantially T-shape with one of the limbs of the T-head in the form of a loop, a bumper recessed to receive said limb, and means for securing said loop in said recess detachably connected to the opposed sides of said bumper.

8. A valve operating float comprising a rod bent to substantially T-shape with one of the limbs of the T-head in the form of a loop, a bumper having a recess in its upper surface adapted to receive said looped limb, and means detachably connected to said bumper for securing the rod in said recess.

9. A valve operating float comprising a rod bent to substantially T-shape with one of the limbs of the T-head in the form of a loop, a bumper having a recess in its upper surface adapted to receive said loop limb, and clamping means detachably connected to said bumper for securing the rod in said recess.

10. A valve operating float comprising a rod bent to substantially T-shape with one of the limbs of the T-head in the form of a loop, a bumper having a vertically disposed recess adapted to yieldably receive said loop limb, and means extending across said recess and secured to opposed sides of said bumper for securing the rod to said bumper.

11. A valve operating float comprising a rod bent to substantially T-shape with one of the limbs of the T-head in the form of a loop, a bumper recessed to receive said looped limb, a clip crossing said loop and engaging said bumper, and a float adjustably mounted on the other T-head limb.

12. A valve operating float comprising a rod bent to substantially T-shape with one of the limbs of the T-head in the form of a loop, a bumper having a recess adapted to receive said loop, yieldable means crossing said loop and detachably connected to said bumper for securing said rod to said recess.

13. The combination of a float rod having a bumper-receiving arm provided with interlocking surfaces, and a recessed resilient bumper to receive and interlock with said arm.

14. The combination of a float rod having a looped bumper-receiving arm, and a recessed resilient bumper to receive and interlock with said looped arm.

In testimony whereof I have hereunto set my hand.

PHILIP MUELLER.